United States Patent

Clark

[15] 3,662,114

[45] May 9, 1972

[54] FRAME SYNCHRONIZATION SYSTEM

[72] Inventor: James M. Clark, Cedar Grove, N.J.

[73] Assignee: International Telephone and Telegraph Corporation, Nutley, N.J.

[22] Filed: May 13, 1970

[21] Appl. No.: 36,744

[52] U.S. Cl. ....... 179/15 BS

[51] Int. Cl. ....... H04j 3/06

[58] Field of Search ....... 179/15 BS, 15 BV, 15 AL; 178/69.5, 50

[56] References Cited

UNITED STATES PATENTS

| | | | |
|---|---|---|---|
| 3,461,245 | 8/1969 | Johannes et al. | 179/50 |
| 3,529,089 | 9/1970 | Davis et al. | 179/15 AL |
| 3,546,384 | 12/1970 | Brigham | 179/15 BS |

*Primary Examiner*—Kathleen H. Claffy
*Assistant Examiner*—David L. Stewart
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

Frame synchronization for a binary data signal having a multiframe including N frames, each of the frames including M channels and a first sync signal, at least one of the channel signals including in each of the frames a different one of (N-1) subchannel signals and a second sync signal is accomplished by employing two sync signal detectors, one being responsive to the first sync signal and a first predetermined local timing signal therefor to provide a first control signal indicative of the phase relation between these two signals and the other being responsive to the second sync signal and a second predetermined local timing signal therefor to provide a second control signal indicative to the phase relation between these two signals. The two control signals are samples by two different sampling circuits. The outputs of the sampling circuits are applied to two different decision circuits whose outputs control the timing of two cascade connected digital counters and timing signal generators used to generate necessary timing signals including the two predetermined local timing signals. The first digital counter and generator is driven by a bit rate clock which is inhibited when the decision circuit associated therewith indicates an out-of-sync condition. The second digital counter and generator is driven by a frame rate clock from the first counter and generator which is inhibited when the decision circuit associated therewith indicates an out-of-sync condition. In one embodiment, the decision circuits are dual integrators each generating two signals to separately control the inhibiting when required. In another embodiment, the decision circuits are single integrators each producing one signal to control the inhibiting when required, the signal of the decision circuit associated with the second sync signal being connected in a cooperating manner with the signal of the decision circuit associated with the first sync signal to control the inhibiting of the bit rate clock.

7 Claims, 8 Drawing Figures

INVENTOR
JAMES M. CLARK
BY Alfred C. Hill
AGENT

INVENTOR
JAMES M. CLARK
BY
Alfred C. Hill
AGENT

INVENTOR
JAMES M. CLARK
BY Alfred C. Hill
AGENT

FRAME SYNCHRONIZATION SYSTEM

BACKGROUND OF THE INVENTION

This invention relates to time division multiplex (TDM) binary data communication systems and more particularly to a frame synchronization system therefor.

There are certain TDM communication systems which employ a long and complex binary data format comprising a multiframe including N frames with each of the frames including M channels with at least one of these channel signals including in each of the frames a different one of N subchannel signals. This type of format would be found in communication systems wherein the subchannel signals are control signals used in the receiver of the system to control the demultiplexing of the frame signals in the multiframe format. Another type of communication system in which such a complex format would be employed is a system for handling multiple rate data wherein the higher speed data is transmitted as the channel signals of the frames and lower speed data is transmitted as the subchannels of the plurality of frames or a multiframe.

It has been the practice in the past where the multiframe format is present in a communication system, particularly those employed with the dual rate data, to employ a single synchronization signal to achieve desired frame synchronization. The timing signals for the rapid and slower speed data channels are synchronized by synchronizing a master clock signal to the bit rate and then employing digital frequency dividers and decoders associated therewith to generate the necessary timing signals for demultiplexing the complex TDM format.

SUMMARY OF THE INVENTION

An object of this invention is to provide a frame synchronization system for long and complex binary data formats which includes therein two frame synchronization codes instead of one.

Another object of the present invention is to provide a frame synchronization system responsive to two frame synchronization codes included in the complex binary data format, said system having an average time to acquire synchronization which is considerably shorter than the time required for prior art frame synchronization systems to acquire synchronization.

Still another object of the present invention is to provide a frame synchronization system including two framing circuits, one circuit responding to a first sync code and the other circuit responding to a second sync code in the complex binary data format, with an interlock between these two circuits enabling a reduction in hardware to implement the frame synchronization system.

A feature of the present invention is to the provision of a frame synchronization system for a TDM binary data signal having a multiframe including N frames, each of the N frames including M channel signals and a first sync signal, at least one of the channel signals including in each of the N frames a different one of (N−1) subchannel signals and a second sync signal, where M and N equal integers greater than one, comprising a first source of the data signal; first means to produce timing signals including a first predetermined timing signal for the first sync signal and a second predetermined timing signal for the second sync signal; second means coupled to the first source and the first means responsive to the data signal and the first and second predetermined timing signals to produce a first control signal indicative of the phase relationship between the first predetermined timing signal and the first sync signal and a second control signal indicative of the phase relationship between the second predetermined timing signal and the second synchronizing signal and third means coupled to the second means and the first means responsive to the first and second control signals to control the phase of the timing signals with respect to the data signal to establish and maintain synchronization.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENTS

Figure 1A:
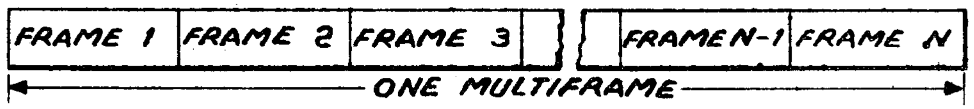
FIGS. 1A–1C are diagrams useful in explaining the format of the data signals upon which the frame synchronization system of the present invention will operate.
Figure 1B:
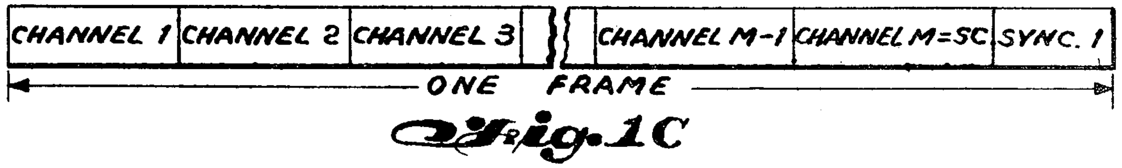
Figure 1C:
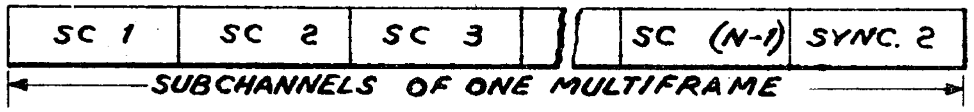

FIGS. 1A–1B illustrate long and complex digital formats employing two frame synchronization codes upon which the frame synchronization system of this invention operates. As mentioned above, a typical situation employing such a format is a digital demultiplexer where received data is demultiplexed or separated into channels, and one or more channels are subdemultiplexed into subchannels. The data is typically arranged by frames within multiframes as shown in FIG. 1A. The first sync code 1 is repeated once per frame as illustrated in FIG. 1B. This sync code and the associated framing circuit will enable the demultiplexer to locate each channel within the frame, but will not allow one frame to be recognized as different from another frame. Assume that there is a special control channel, such as channel M or channel SC in FIG. 1B, which is submultiplexed. Then a typical submultiplexing format is shown in FIG. 1C which shows only the SC channels within one multiframe. A second sync code within this submultiplexed channel format and an associated framing circuit will allow the demultiplexer to locate each subchannel within the multiframe. The second framing circuit can be synchronized more quickly by sampling only the SC bits, because the bits of the second sync code are SC bits. The second framing circuit cannot be synchronized, however, until the first framing circuit is synchronized, thus correctly locating the SC bits. The formats shown in FIGS. 1A, 1B and 1C are only typical samples. The only real assumption made here is that there is a first sync code repeated once every M data bits, which is called a frame herein, and a second sync code repeated once every N frames (MN bits), which is called a multiframe herein.

For purposes of explanation only, it will be assumed that sync code 1 is a "0," "1" pattern continually repeated in the N frames of the multiframe. Synchronization to this code synchronizes the frame channels and locates odd and even bits of the SC channel which may include control channels and sync code 2. It is assumed that sync code 2 is a 00001111 word continually repeated every multiframe.

Figure 2:
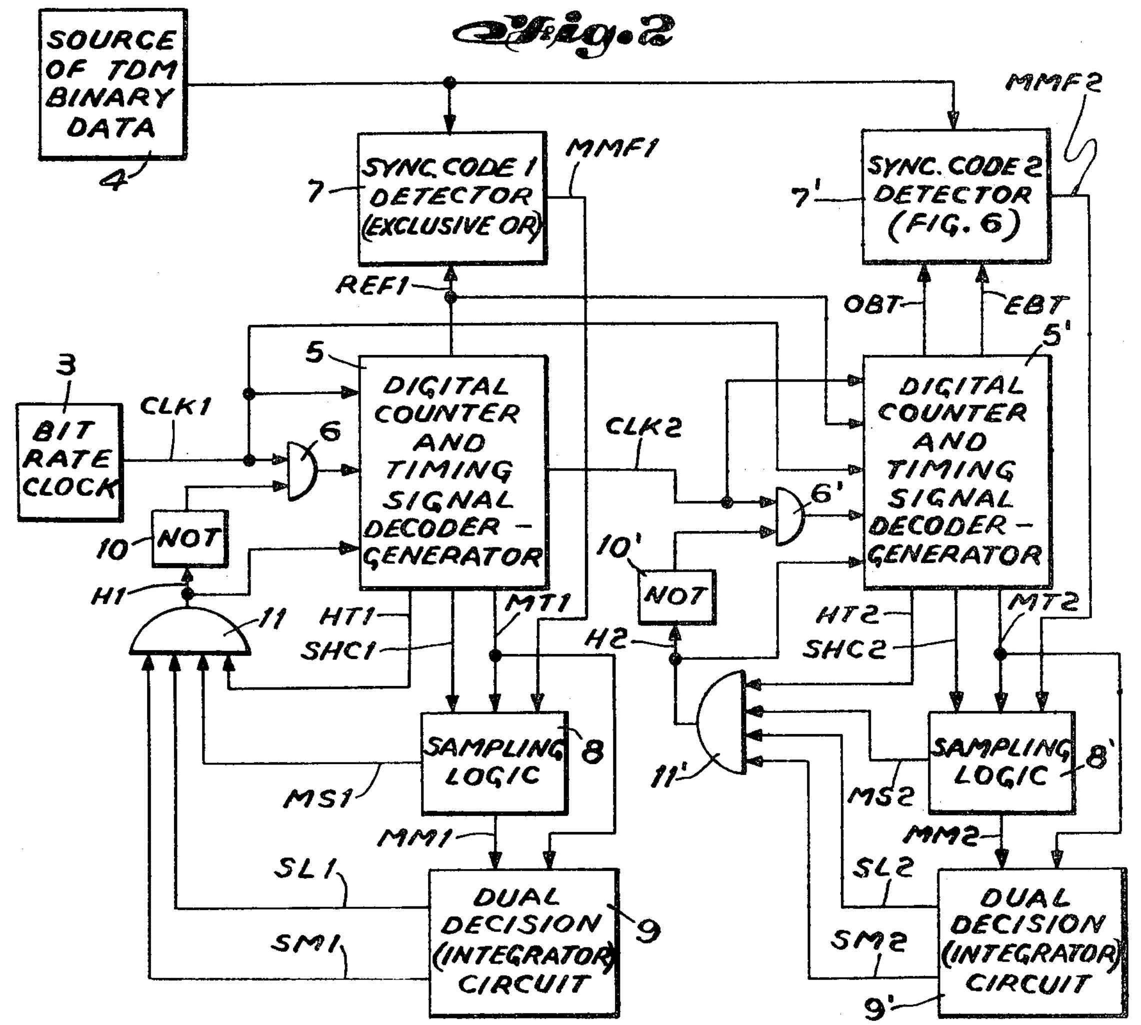
FIG. 2 is a block diagram of one embodiment of the frame synchronization system in accordance with the principles of this invention.

Referring to FIG. 2, there is illustrated therein in block diagram form one embodiment of the frame synchronization system in accordance with the principles of this invention. Clock 3 provides a clock signal CLK1 at the bit rate of the multiframe with this clock signal being synchronous with the received data signal from source 4. This synchronization between clock signal CLK 1 and the received data can be obtained by any well known bit synchronization arrangement such as, for instance, a phase locked loop type circuit. The output from source 3 triggers a divide by M counter in digital counter and timing signal decoder-generator 5 except when inhibited by halt signal H1 applied to AND gate 6 through NOT gate 10. Counter-generator 5 generate frame timing signals, including a frame rate clock CLK 2, which locates the SC bits of each frame. Other timing signals generated are similar to those disclosed in my copending applications, Ser. No. 780,981 now U.S. Pat. No. 3,594,502, issued July 20, 1971, and Ser. No. 781,181 now U.S. Pat. No. 3,597,539, issued Aug. 3, 1971, identified therein as sync time signal ST, halt time signal HT, triggering signal SHC and triggering signal MT. The MT signal is produced by AND gating the bit rate clock CLK 1 with the sync time signal ST. The SHC signal is produced by OR gating the halt signal H with the sync time signal ST and AND gating the output of the OR gate with the bit rate clock signal CLK1 in copending application Ser. No. 781,181. On the other hand the SHC signal in the copending application Ser. No. 780,981 is produced by OR gating the ST signal with shift register timing signal SH and AND gating the output of the OR with the bit rate clock signal CLK1.

Counter-generator 5 also produces as one of its timing signals a reference signal REF 1 for the first sync code contained in the data from source 4. As disclosed in the above mentioned copending applications the signal REF1 is a square wave having a repetition frequency equal to one-half the frame repetition frequency when employing as the first sync code the "1," "0" pattern in adjacent frames.

Sync code 1 detector 7 compares the data signal and REF1 signal and generates a signal MMF 1 which indicates mismatches between the data signal and the reference signal REF1. A mismatch is a binary "1" and a match produces a binary "0." With the first sync code and REF1 signal as assumed above, detector 7 could be in the form of an EXCLUSIVE OR gate. The output signal MMF1 from detector 7 is coupled to sampling logic 8 which may be in the form of two flip flops, such as flip flops 8 and 19 of the above identified copending application Ser. No. 781,181 or flip flops 8 and $B_N$ of the above identified copending application Ser. No. 780,981. Logic 8 samples the mismatch signal MMF1 at regular intervals and is applied to dual decision circuit 9. The halt signal H1 is produced having a high value only when halt timing signal HT1, mismatch sample signal MS1, search level signal SL1, and search mode signal SM1 all have a high value to enable AND gate 11. Typically, signal MS1 is identical to MM1. However, when either of the techniques described in the above mentioned copending applications are used, signal MS1 includes samples in addition to those of signal MM1. The SL1 signal indicated when the rate of mismatches has exceeded a certain level, thus permitting searching, that is, halting of the counters of counter-generator 5 to adjust their phase. With the dual decision circuit 9 being used, signal SM1 is also generated, indicating when the decision circuit is in a state called "search mode" which also permits searching.

Figure 6:
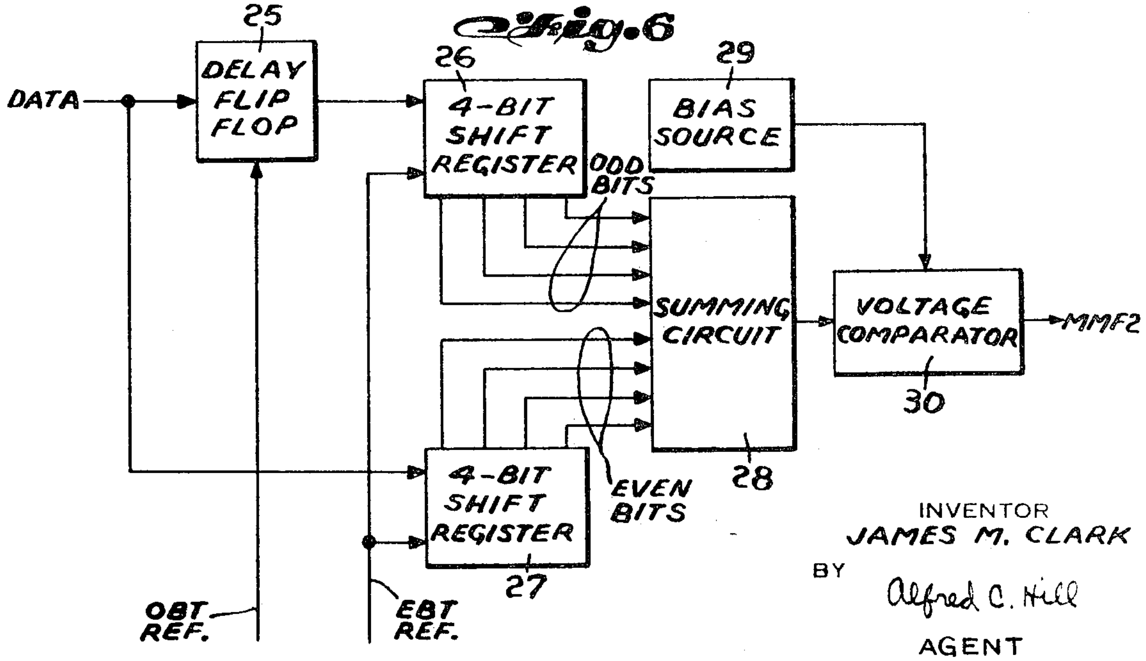
FIG. 6 is a block diagram illustrating one form of sync signal detector which may be employed for detector 7′ of FIGS. 2 and 3.

It should be noted that the left and right sides of FIG. 2 are similar. Each has a framing circuit. The framing circuit just described is for frame timing. Digital counter and timing signal decoder-generator 5′ includes a divided by N counter to count the frame rate clock signal CLK 2 except when inhibited by the operation of AND gate 6′ in the presence of a halt signal H2. The circuitry in counter-generator 5′ produces multiframe timing signals and the circuitry associated therewith synchronizes the multiframe timing in a manner similar to the frame timing just described. The timing signals HT2, SHC2 and MT2 are produced as described above with reference to counter-generator 5, but with the clock pulse in this situation being clock CLK2. Generator 5′ in addition to the above timing signals also produces two timing signals to control the operation of sync code 2 detector 7′. These two timing signals are the odd bit timing signal OBT and the even bit timing signal EBT. These two timing signals are produced by AND gating reference signal REF1, the bit rate clock CLK1 and the bit timing signal for the SC channels. Detector 7′ is more complex than detector 7 due to the type of sync code employed for the second sync signal. One embodiment for this detector is disclosed in FIG. 6 described hereinbelow.

Detector 7′ includes therein, due to its internal wiring, circuitry that will detect the entire code, allowing up to some number of bit mismatches per code, according to the detector threshold. Detector 7′ is coupled to source 4 and produces a mismatch output signal MMF2 which is coupled to sampling circuit 8′ having the same arrangement for producing signals MS2 and MM2 as described with reference to sampling logic 8. The output from sampling 8′ is coupled to dual decision circuit 9′ producing the search level signal SL2 and search mode signal SM2 for application to AND gate 11′ whose output is coupled to NOT gate 10′.

Detectors 7 and 7′, as is apparent from above, are two different types of circuits. Detector 7 compares the input data with a reference signal that describes the sync code, that is, the sequence of bit values. However, with detector 7′ the description of the sync code is built into the sync code detector, and no references signal is required. Detector 7 indicates a match for each bit of the code, but detector 7′ indicates a match for the entire code, allowing up to some number of bit mismatches per code according to the detector threshold. For detector 7, the phase of the reference signal is corrected by the searching action. For detector 7′, however, there is no external reference signal and the timing signals used in the example (EBT and OBT) are not changed by the framing circuit coupled to generator 5′, but are synchronized by the framing circuit coupled to generator 5. Timing signals EBT and OBT specify the timing of the SC channels, of which sync code 2 is only a part.

The description of the two detectors 7 and 7′ detecting sync code 1 and sync code 2, respectively, are only by way of example. It should be understood that the techniques of this invention are equally applicable to use of any type of code for sync codes 1 and 2, and to use of either type of detector for sync codes 1 and 2, these choices being determined primarily by system requirements.

Figure 3:
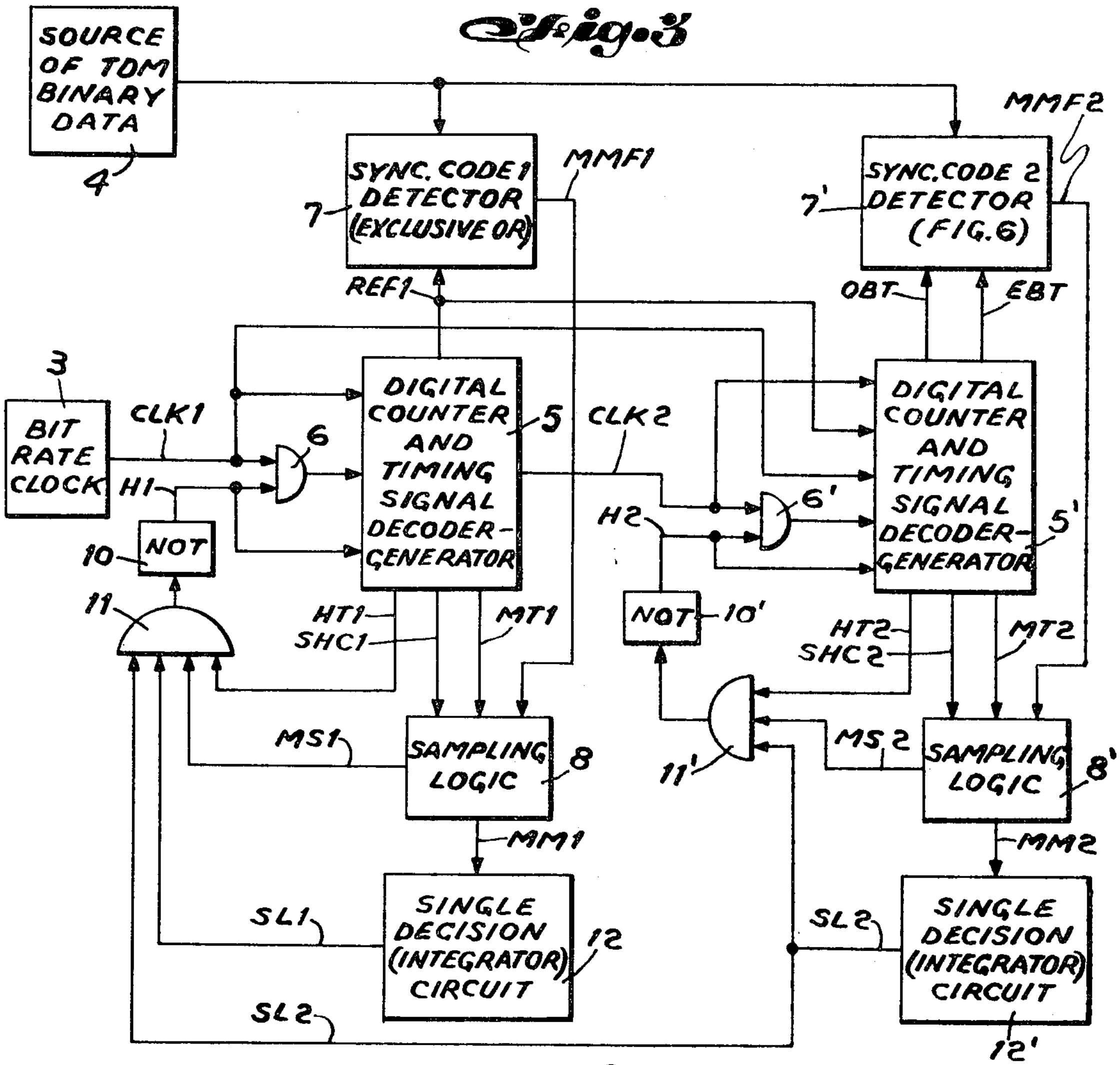
FIG. 3 is a block diagram of another embodiment of the frame synchronization system in accordance with the principles of the present invention.

FIG. 3 is identical to FIG. 2 in all respects and operates exactly like FIG. 2 with the exception that the MM output signals from sampling logics 8 and 8′ are coupled to "single" decision circuits 12 and 12′. In addition, timing signal MT is not coupled to decision circuits 12 and 12′ and there is no search mode output SM from decision circuits 12 and 12′. Rather, the SL2 output of circuit 12′ is coupled to AND gate 11 as well as AND gate 11′.

It should be noted that in the description of FIGS. 2 and 3 AND gates 11 and NOT gates 10 have been described as separate units. It will be obvious that the AND and NOT gates perform the same function as a NAND gate and, thus, a NAND gate could be substituted for these two gate elements.

From a statistical point of view, the average rate of mismatches per sample for signals MM1 and MM2 has an expected value higher than some rate referred to herein as the "threshold probability" when the counters are not synchronized, and the average mismatch rate is expected to be less than this "threshold probability" when the counters are synchronized. The decision circuits 9, 9′, 12 and 12′ of FIGS. 2 and 3 use the above principle to judge whether or not the associated counters are synchronized; or, in other words, whether or not the present frame phase is correct.

Figure 4:
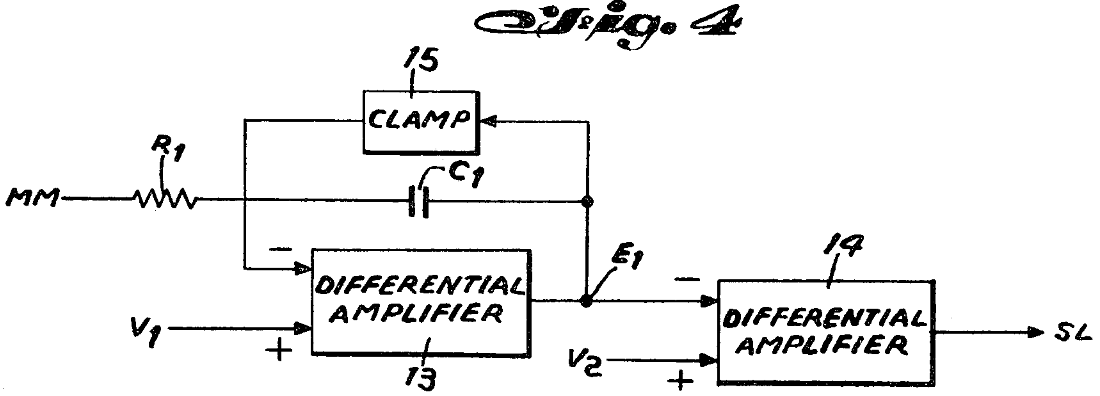
FIG. 4 is a block diagram of one form of the single decision circuit employed in FIG. 3.

FIG. 4 shows a single decision circuit, which is an integrator or betting circuit, that may be employed for circuits 12 and 12′ of FIG. 3 which accomplished the above-mentioned function. This circuit is called a "betting" circuit because the operation of the circuit from a statistical point of view is exactly analogous to a type of betting situation. Amplifiers 13 and 14 are high gain differential amplifiers. Amplifier 13, capacitor C1 and resistor R1 together form a Miller type integrator with a time constant equal to $R_1 C_1$. When signal MM is a "1," indicating a mismatch, the voltage $E_1$ goes down at a certain rate. When signal MM is "0" for a match, voltage $E_1$, goes up at another rate. The fixed bias voltage $V_1$ determines the ratio of the up and down rates, and thereby also determines the threshold probability of the circuit. When the mismatch rate exceeds the threshold probability, voltage $E_1$ goes down more than up; and when the mismatch rate is less than the threshold probability, the voltage $E_1$ goes up more than down.

The above statements, however, ignore limitations on the voltage $E_1$. No amplifier can either increase or decrease its output voltage without limit. At some point, the voltage can change no further. Thus, voltage $E_1$ is limited to some range by the amplifier itself. The value of the lower limit is important to the relationship of the integrator to amplifier 14, and in the case that the lower limit due to amplifier 13 is not stable with regard to circuit tolerances, a more stable limit may be defined by providing clamp circuit 15 as illustrated. Clamp circuit 15 provides negative feedback when the limiting voltage is reached.

Amplifier 14 is used as a voltage comparator. Its output SL is high (logical "1") when voltage $E_1$ is lower than the bias voltage $V_2$ and output SL is low (logical "0") when voltage $E_1$ is higher than bias voltage $V_2$. Bias voltage $V_2$ is a fixed voltage between the upper and lower limits of voltage $E_1$, but closer to the lower limit.

The framing circuit works in two modes. In the sense mode, it is assumed that the phase of the counters has been corrected, and the betting circuit must detect whether the frame phase is now incorrect (loss of synchronization). In the search mode, it is assumed that the frame phase has been incorrect. Adjustment of the phase is made, and the betting circuit must decide whether the frame phase is now correct. Both modes must be considered in the design of the betting circuit.

For the sense mode, it is often required that the response of the betting circuit must be slow. This guards against signal fading, such as encountered in tropospheric scatter radio communications. Fading of the received signal commonly causes the mismatch rate to exceed the threshold probability. This causes the betting circuit to decide that the frame phase is incorrect, when indeed it is correct. This allows the framing logic to search, that is, adjust the phase, and the first adjustment will make the phase incorrect. If, however, the response of the betting circuit is slow compared to the duration of a fade, the fade will cease before an erroneous decision can be made.

For the search mode, it is typically required that the response of the betting circuit must be fast. This is an important factor in reducing the average search time (time to acquire synchronization), since the betting circuit makes many decisions during a search.

The conflicting (but not contradicting) requirements that the response of the betting circuit must be slow for the sense mode and fast for the search mode means that it must take a long time for voltage $E_1$ to decrease from its upper limit to voltage $V_2$ and a short time for voltage $E_1$ to increase from its lower limit to voltage $V_2$. To satisfy both requirements, voltage $V_2$ must be much closer to the lower limit voltage than the upper limit voltage, and voltage $V_1$ must be set as high as possible, making the threshold probability as close as possible to the lowest mismatch rate expected for an incorrect phase. However, consideration of component variations and power supply voltage that might cause the voltages $V_1$, $V_2$ or the clamp voltage to change with time or temperature place a limit on how accurately $V_1$ and $V_2$ may be set without making a functional failure probable. The result is that in some cases a simple betting circuit cannot satisfy both of the stated requirements.

Figure 5:
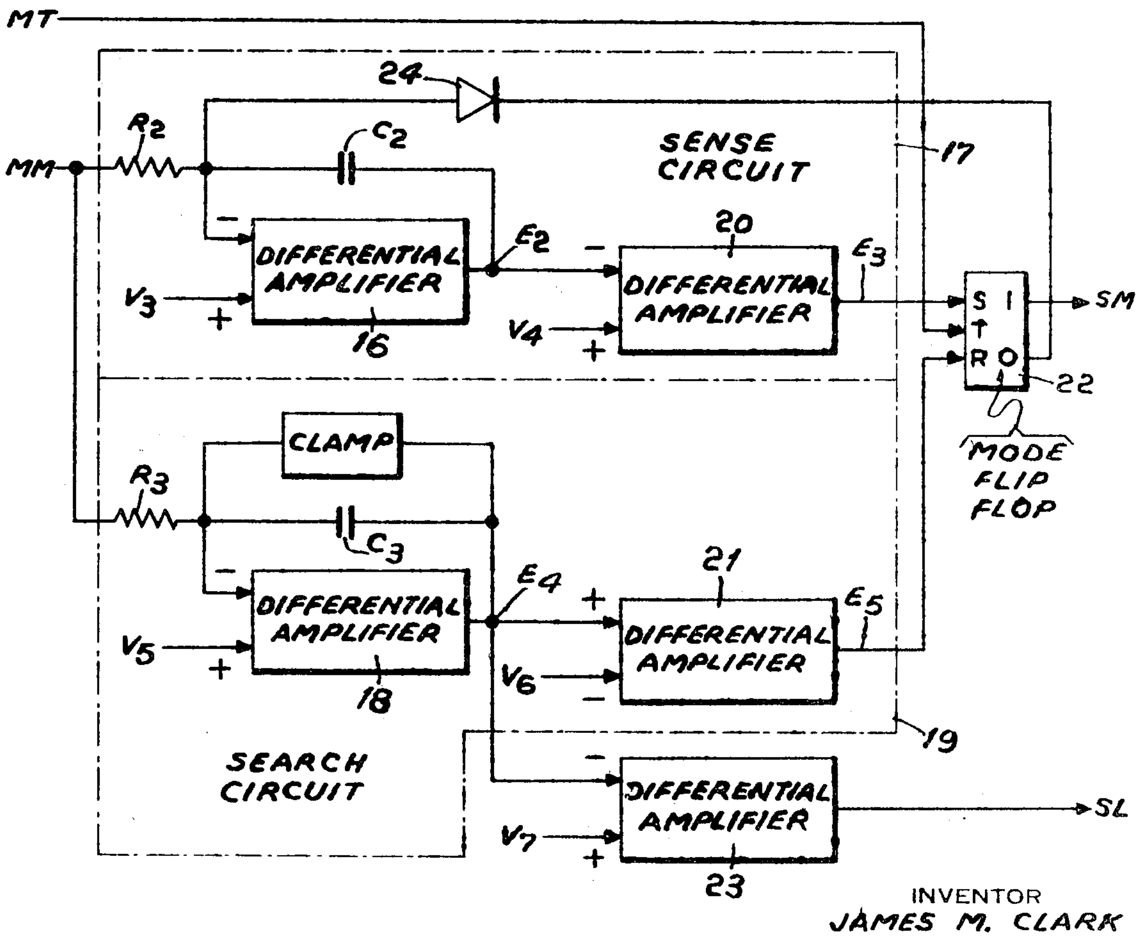
FIG. 5 is a block diagram illustrating one form of the dual decision circuit employed in FIG. 2.

FIG. 5 illustrates a dual decision circuit which is a dual integrator or betting circuit, avoiding the above problem. The input MM operates two integrator circuits. The integrator composed of high gain differential amplifier 16, resistor $R_2$ and capacitor $C_2$ is in the sense circuit 17 and the integrator composed of high gain differential amplifier 18, resistor $R_3$ and capacitor $C_3$ is in the search circuit 19. The time constant $R_2$ $C_2$ is made large to increase the sense mode response, and the time constant $R_3$ $C_3$ is made small to decrease the search mode response. High gain differential amplifier 20 provides a voltage comparator for sense circuit 17 and high gain differential amplifier 21 provides a voltage comparator for search circuit 19. Amplifiers 20 and 21 are arranged as shown to set and reset mode flip flop 22 as follows.

When synchronization is lost, the average mismatch rate exceeds the threshold probability set by bias voltage $V_3$, voltage $E_2$ goes down more than up, and eventually voltage $E_2$ becomes less than bias voltage $V_4$, causing voltage $E_3$ to become high and setting mode flip flop 22 to provide a "1" at the "1" output thereof. The output signal SM is equal to "1," representing the search mode, and enables searching to begin. Since search circuit 19 has a smaller time constant, voltage $E_4$ will go down faster and sooner than $E_2$ and the SL output from high gain differential amplifier 23 will become "1," before signal SM becomes "1." Since both output signals SL and SM are required to enable searching (note AND gates 11 and 11' of FIG. 2), the slower circuit, namely, sense circuit 17, determines the sense time, or the time for response to a loss of synchronization.

During the search for the correct phase, search circuit 19 and the voltage comparator provided by differential amplifier 23 operate in a manner similar to the simple betting circuit of FIG. 4. When the frame phase is correct, the average mismatch rate is less than the threshold probability set by bias voltage $V_5$, $E_4$ goes up more than down, and eventually $E_4$ becomes higher than voltage $V_6$, causing voltage $E_5$ to become high and to reset mode flip flop 22 to "0," which represents the sense mode.

Since the sense circuit is slower, voltage $E_2$ cannot go up as fast as voltage $E_4$, and there is a possibility that soon after acquiring synchronization, when voltage $E_2$ is low and not yet up to the upper limit voltage, that a short fade can make the framing circuit lose synchronization, because voltage $E_2$ being low will make the response time of the sense circuit 17 shorter than normal. To avoid this problem, the "0" output of flip flop 22 is coupled back to the negative or inverting input of amplifier 16 through diode 24. During sense mode, the "0" output of flip flop 22 is high, reverse biasing diode 24, and having no effect on sense circuit 17. During search mode, when sense circuit 17 is not being used, the "0" output of flip flop 22 is low, forward biasing diode 24, and drawing current from the inverting input of amplifier 16. The low source impedance of this signal enables voltage $E_2$ to be rapidly set to its upper limit voltage.

By clocking flip flop 22 with the frame timing signal MT, flip flop 22 will change state synchronously with the counters. However, the timing signal MT is necessary only if the type of flip flop used requires a clock pulse.

According to the present invention, it has been found that two simple betting circuits can be used in a frame synchronization system as illustrated in FIG. 3, instead of two dual betting circuit as shown in FIG. 2, and yet retain the advantage of the dual betting circuit, provided the two framing circuits are interlocked as shown in FIG. 3 by coupling the SL2 output of circuit 12' to AND gate 11 as well as AND gate 11'. This results in a saving of six differential amplifiers, two flip flops and other associated components.

Betting circuit 12' receives samples at a slower rate than betting circuit 12, because clock CLK 2 is slower and the sync code is distributed over a longer period of time (a multiframe). Thus, it is easier for betting circuit 12' to have a long sense time, that is, a slow response in the sense mode. The first framing circuit can be protected by this same slow response by connecting signals SL2 as well as SL1 to AND gate 11. Thus, when the mismatch rates are higher than threshold, the first framing circuit will not halt even when betting circuit 12 responds quickly and SL1 soon becomes "1." Halting begins only after SL2 becomes "1."

With regard to FIGS. 2 and 3 detector 7 has been indicated to be merely an EXCLUSIVE OR gate. The reference signal REF1 is a timing signal which has the same binary value as the first sync signal when the phase of counter-generator 5 is correct. The EXCLUSIVE OR gate compares all multiframe data bits with this reference value. Detector 7' required to detect the second sync code, which has been assumed to be eight bits long with a predetermined sequence of binary "1"'s and binary "0"'s, is more complicated. This detector is illustrated in detail in FIG. 6. The data from source 4 is coupled to delay flip flop 25, which might also be called a one bit shift register. Flip flop 25 in addition to the first flip flop shift register 26 sample the data signal. The timing signal OBT coinciding with the odd SC bits and timing signal and EBT coinciding with the even SC bits are produced in counter-generator 5' as described above. Delay flip flop 25 samples only the odd SC bits because it receives the odd timing signal. Its output is transferred to the four bit shift register 26 by the even timing signal. As a result the odd SC bits passing through delay flip flop 25 encounters a delay of one SC bit period and are brought into step with the even SC bits. The odd SC bits are shifted down shift register 26 and the even bits are shifted down the four bit shift register 27. The shifting rate is one shift per two SC bits. Thus, all of the SC bits pass through the two shift registers, which serve to hold the data for inspection.

When the eight bit synchronization code word fully occupies the two shift registers, and there are no bits in error (due to noise), the detector indicates a match. To accomplish this, there is one flip flop in shift registers 26 and 27 associated with each bit of sync code 2. If the sync bit is "1," the "1" output of the associated flip flop of the shift registers is wired to summing circuit 28. For a "0" sync bit, the "0" output of the associated flip flop of the shift registers is wired to summing circuit 28 to get a "1" level when the "0" code bit resets the associated flip flop. This is the wiring that describes the sync code internal to the sync code detector. Summing circuit 28 receives eight "1"'s when the shift registers hold the exact sync word. If $n$ bits are in error due to noise, or because the bits are not part of the second sync code, or because the sync bits are not in their proper positions in the shift registers, summing circuit 28 will receive $n$ "0"'s and $(8-n)$ "1"'s. Summing circuit 28 generates a voltage proportional to the number of "zeroes" or bit errors. It may also be inverting. Bias source 29 generates a voltage which, by the same proportional scale, is equivalent to $(y-0.5)$ bit errors, where $y$ is the code mismatch threshold. Voltage comparator 30 indicates a code mismatch when the number of bit errors exceeds $(y-0.5)$.

While I have described above the principles of my invention in connection with specific apparatus, it is to be clearly understood that this description is made only by way of example.

I claim:

1. A frame synchronization system for a time division multiplex binary data signal having a multiframe including N frames, each of said N frames including M channel signals and a first frame sync signal, at least one of said M channel signals including in each of said N frames a different one of (N–1) subchannel signals and a second frame sync signal, where M and N equal integers greater than one, comprising:

a first source of said data signal;

first means to produce timing signals including a first predetermined timing signal for said first sync signal and a second predetermined timing signal for said second sync signal;

second means coupled to said first source and said first means, said second means being responsive to said data signal and said first and second predetermined timing signals to produce a first control signal indicative of the phase relationship between said first predetermined timing signal and said first sync signal and a second control signal indicative of the phase relationship between said second predetermined timing signal and said second sync signal; and third means coupled to said second means and said first means, said third means being responsive to said first and second control signals to control the phase of said timing signals with respect to said data signal to establish and maintain frame synchronization;

said first means including a second source of bit rate clock synchronous with the bits of said data signal;

a first divider and timing signal generator to provide said first predetermined timing signal, certain others of said timing signals and a frame rate clock;

first logic circuitry coupled between said second source and said first divider and generator responsive to the output of said third means to control the coupling of said bit rate clock to said first divider and generator to control the phase of said certain others of said timing signals, said first predetermined timing signal and said frame rate clock;

a second divider and timing signal generator to provide said second predetermined timing signal and additional ones of said timing signals; and second logic circuitry coupled between said first and second divider and generator responsive to the output of said third means to control the coupling of said frame rate clock to said second divider and generator to control the phase of said additional ones of said timing signals and said second predetermined timing signal;

said first logic circuitry including a first NAND gate coupled to said third means, and a first AND gate coupled to said first NAND gate and between said second source and said first divider and generator; and said second logic circuitry including a second NAND gate coupled to said third means, and a second AND gate coupled to said second NAND gate and between said first and second divider and generators.

2. A frame synchronization system for a time division multiplex binary data signal having a multiframe including N frames, each of said N frames including M channel signals and a first frame sync signal, at least one of said M channel signals including in each of said N frames a different one of (N–1) subchannel signals and a second frame sync signal, where M and N equal integers greater than one, comprising:

a first source of said data signal;

first means to produce timing signals including a first predetermined timing signal for said first sync signal and a second predetermined timing signal for said second sync signal;

second means coupled to said first source and said first means, said second means being responsive to said data signal and said first and second predetermined timing signals to produce a first control signal indicative of the phase relationship between said first predetermined timing signal and said first sync signal and a second control signal indicative of the phase relationship between said second predetermined timing signal and said second sync signal; and third means coupled to said second means and said first means, said third means being responsive to said first and second control signals to control the phase of said timing signals with respect to said data signal to establish and maintain frame synchronization;

said second means including a first detector coupled to said first source and said first means, said first detector being responsive to said first predetermined timing signal and said data signal to produce said first control signal, and a second detector coupled to said first source and said first means, said second detector being responsive to said second predetermined timing signal and said data signal to produce said second control signal;

said first sync signal including a binary "1" and a binary "0" in alternate ones of said N frames;

said first predetermined timing signal including a square wave having a repetition frequency equal to one half the repetition frequency of said N frames;

said second sync signal including $m$ consecutive bits having a predetermined sequence of binary "1" and binary "0," where $m$ is an integer greater than one;
said second predetermined timing signal including
a third predetermined timing signal having a timing corresponding to the odd bits of said $m$ consecutive bits, and
a fourth predetermined timing signal having a timing corresponding to the even bits of said $m$ consecutive bits;
said first detector including
an EXCLUSIVE-OR gate coupled to said first source and said first means responsive to said data signal and said square wave to produce said first control signal;
said second detector including
a delay flip flop coupled to said first source and said first means responsive to said data signal and said third predetermined timing signal,
a first $m/2$ stage shift register coupled to said flip flop and said first means responsive to the output of said flip flop and said fourth predetermined timing signal,
a second $m/2$ stage shift register coupled to said first source and said first means responsive to said data signal and said fourth predetermined timing signal,
a summing circuit coupled to each stage of each of said first and second shift registers, and
voltage comparison means coupled to the output of said summing circuit to produce said second control signal.

3. A frame synchronization system for a time division multiplex binary data signal having a multiframe including N frames, each of said N frames including M channel signals and a first frame sync signal, at least one of said M channel signals including in each of said N frames a different one of (N−1) subchannel signals and a second frame sync signal, where M and N equal integers greater than one, comprising:
a first source of said data signal;
first means to produce timing signals including a first predetermined timing signal for said first sync signal and a second predetermined timing signal for said second sync signal;
second means coupled to said first source and said first means, said second means being responsive to said data signal and said first and second predetermined timing signals to produce a first control signal indicative of the phase relationship between said first predetermined timing signal and said first sync signal and a second control signal indicative of the phase relationship between said second predetermined timing signal and said second sync signal; and
third means coupled to said second means and said first means, said third means being responsive to said first and second control signals to control the phase of said timing signals with respect to said data signal to establish and maintain frame synchronization;
said third means including
a first sampling circuit coupled to said second means to sample said first control signal to provide a first output signal coupled to a first portion of said first means and a second output signal,
a first dual integration circuit coupled to said first sampling circuit responsive to said second output signal to provide third and fourth output signals coupled to said first portion of said first means,
a second sampling circuit coupled to said second means to sample said second control signal to provide a fifth output signal coupled to a second portion of said first means and a sixth output signal, and
a second dual integration circuit coupled to said second sampling circuit responsive to said sixth output signal to provide seventh and eighth output signals coupled to said second portion of said first means,
said first, third, fourth, fifth, seventh and eighth output signals cooperating to control the phase of said timing signals to establish and maintain synchronization.

4. A system according to claim 3, wherein
each of said first and second integration circuits includes
a flip flop having a SET input, a RESET input, a "1" output and a "0" output, said "1" output providing one of said third and seventh output signal,
a sense circuit having
a first bias source,
a first resistor coupled to one of said first and second sampling circuitries
a second bias source,
a first differential amplifier having its positive input coupled to said first bias source and its negative input coupled to said first resistor,
a first capacitor coupled between the output and negative input of said first amplifier,
a second differential amplifier having its negative input coupled to the output of said first amplifier, its positive input coupled to said second bias source and its output coupled to said SET input, and
a diode coupled between said "0" output and the negative input of said first amplifier poled to be reverse biased when the output of said "0" output is high and to be forward biased when the output of said "0" output is low,
the value of said first resistor and said first capacitor providing a large time constant for said sense circuit, and
a search circuit having
a third bias source,
a second resistor coupled to said one of said first and second sampling circuitries,
a fourth bias source,
a fifth bias source,
a third differential amplifier having its positive input coupled to said third bias source and its negative input coupled to said second resistor,
a second capacitor coupled between the output and negative input of said third amplifier,
a clamp circuit coupled between the output and negative input of said third amplifier,
a fourth differential amplifier having its positive input coupled to the output of said third amplifier, its negative input coupled to said fourth bias source and its output coupled to said RESET input, and
a fifth differential amplifier having its positive input coupled to said fifth bias source, its negative input coupled to the output of said third amplifier and its output providing one of said fourth and eighth output signals,
the value of said second resistor and said second capacitor providing a small time constant for said search circuit.

5. A frame synchronization system for a time division multiplex binary data signal having a multiframe including N frames, each of said N frames including M channel signals and a first frame sync signal, at least one of said M channel signals including in each of said N frames a different one of (N−1) subchannel signals and a second frame sync signal, where M and N equal integers greater than one, comprising:
a first source of said data signal;
first means to produce timing signals including a first predetermined timing signal for said first sync signal and a second predetermined timing signal for said second sync signal;
second means coupled to said first source and said first means, said second means being responsive to said data signal and said first and second predetermined timing signals to produce a first control signal indicative of the phase relationship between said first predetermined timing signal and said first sync signal and a second signal indicative of the phase relationship between said second predetermined timing signal and said second sync signal; and
third means coupled to said second means and said first means, said third means being responsive to said first and second control signals to control the phase of said timing signals with respect to said data signal to establish and maintain frame synchronization;

said third means including a first sampling circuit coupled to said second means to sample said first control signal to provide a first output signal coupled to a first portion of said first means and a second output signal, a first integration circuit coupled to said first sampling circuit responsive to said second output signal to provide a third output signal coupled to said first portion of said first means, a second sampling circuit coupled to said second means to sample said second control signal to provide a fourth output signal coupled to a second portion of said first means and a fifth output signal, and a second integration circuit coupled to said second sampling circuit responsive to said fifth output signal to provide a sixth output signal coupled to said first and second portions of said first means, said first, third, fourth and sixth output signals cooperating to control the phase of said timing signals to establish and maintain synchronization.

6. A frame synchronization system for a time division multiplex binary data signal having a multi-frame including N frames, each of said N frames including M channel signals and a first frame sync signal, at least one of said M channel signals including in each of said N frames a different one of (N−1) subchannel signals and a second frame sync signal, where M and N equal integers greater than one, comprising:

a first source of said data signal;

first means to produce timing signals including a first predetermined timing signal for said first sync signal and a second predetermined timing signal for said second sync signal;

second means coupled to said first source and said first means, said second means being responsive to said data signal and said first and second predetermined timing signals to produce a first control signal indicative of the phase relationship between said first predetermined timing signal and said first sync signal and a second control signal indicative of the phase relationship between said second predetermined timing signal and said second sync signal; and third means coupled to said second means and said first means, said third means being responsive to said first and second control signals to control the phase of said timing signals with respect to said data signal to establish and maintain frame synchronization;

said first means including a second source of bit rate clock synchronous with the bits of said data signal;

a first divider and timing signal generator to provide said first predetermined timing signal, certain others of said timing signals and a frame rate clock;

first logic circuitry coupled between said second source and said first divider and generator responsive to the output of said third means to control the coupling of said bit rate clock to said first divider and generator to control the phase of said certain others of said timing signals, said first predetermined timing signal and said frame rate clock;

a second divider and timing signal generator to provide said second predetermined timing signal and additional ones of said timing signals; and second logic circuitry coupled between said first and second divider and generator responsive to the output of said third means to control the coupling of said frame rate clock to said second divider and generator to control the phase of said additional ones of said timing signals and said second predetermined timing signal;

said second means including a first detector coupled to said first source and said first divider and generator responsive to said first predetermined timing signal and said data signal to produce said first control signal; and a second detector coupled to said first source and said second divider and generator responsive to said second predetermined timing signal and said data signal to produce said second control signal; and said third means including a first sampling circuitry coupled to said first detector to sample said first control signal to provide a first output signal coupled to said first logic circuitry and a second output signal;

a first dual integration circuit coupled to said first sampling circuit responsive to said second output signal to provide third and fourth output signals coupled to said first logic circuitry;

a second sampling circuit coupled to said second detector to sample said second control signal to provide a fifth output signal coupled to said second logic circuitry and a sixth output signal; and a second dual integration circuit coupled to said second sampling circuit responsive to said sixth output signal to provide seventh and eighth output signals coupled to said second logic circuitry.

7. A frame synchronization system for a time division multiplex binary data signal having a multiframe including N frames, each of said N frames including M channel signals and a first frame sync signal, at least one of said M channel signals including in each of said N frames a different one of (N−1) subchannel signals and a second frame sync signal, where M and N equal integers greater than one, comprising:

a first source of said data signal;

first means to produce timing signals including a first predetermined timing signal for said first sync signal and a second predetermined timing signal for said second sync signal;

second means coupled to said first source and said first means, said second means being responsive to said data signal and said first and second predetermined timing signals to produce a first control signal indicative of the phase relationship between said first predetermined timing signal and said first sync signal and a second control signal indicative of the phase relationship between said second predetermined timing signal and said second sync signal; and third means coupled to said second means and said first means, said third means being responsive to said first and second control signals to control the phase of said timing signals with respect to said data signal to establish and maintain frame synchronization;

said first means including a second source of bit rate clock synchronous with the bits of said data signal;

a first divider and timing signal generator to provide said first predetermined timing signal, certain others of said timing signals and a frame rate clock;

first logic circuitry coupled between said second source and said first divider and generator responsive to the output of said third means to control the coupling of said bit rate clock to said first divider and generator to control the phase of said certain others of said timing signals, said first predetermined timing signal and said frame rate clock;

a second divider and timing signal generator to provide said second predetermined timing signal and additional ones of said timing signals; and second logic circuitry coupled between said first and second divider and generator responsive to the output of said third means to control the coupling of said frame rate clock to said second divider and generator to control the phase of said additional ones of said timing signals and said second predetermined timing signal;

said second means including a first detector coupled to said first source and said first divider and generator responsive to said first predetermined timing signal and said data signal to produce said first control signal; and a second detector coupled to said first source and said second divider and generator responsive to said second predetermined timing signal and said data signal to produce said second control signal; and said third means including a first sampling circuit coupled to said first detector to sample said first control signal to provide a first output signal coupled to said first logic circuitry and a second output signal;

a first integration circuit coupled to said first sampling circuit responsive to said second output signal to provide a third output signal coupled to said first logic circuitry;

a second sampling circuit coupled to said second detector to sample said second control signal to provide a fourth output signal coupled to said second logic circuitry and a fifth output signal; and a second integration circuit coupled to said second sampling circuit responsive to said fifth output signal to provide a sixth output signal coupled to said first and second logic circuitry.

* * * * *